Sept. 25, 1962     D. J. JAY ET AL     3,055,312
HIGH SPEED TRANSPORTATION VEHICLE
Filed Oct. 3, 1958     3 Sheets-Sheet 1

D.J. JAY
H.W. PEITHMAN
*INVENTOR.*

BY *E.C. McRae*
*J.H. Oster*
*K.L. Zerschling*

ATTORNEYS

Sept. 25, 1962 D. J. JAY ET AL 3,055,312
HIGH SPEED TRANSPORTATION VEHICLE
Filed Oct. 3, 1958 3 Sheets-Sheet 2

D. J. JAY
H. W. PEITHMAN
INVENTOR.

BY E. C. McRae
F. H. Oster
K. L. Zerschling
ATTORNEYS

United States Patent Office 3,055,312
Patented Sept. 25, 1962

3,055,312
HIGH SPEED TRANSPORTATION VEHICLE
David J. Jay, Detroit, and Harlan W. Peithman, Livonia, Mich., assignors to Ford Motor Company, Dearborn, Mich., a corporation of Delaware
Filed Oct. 3, 1958, Ser. No. 765,114
6 Claims. (Cl. 104—134)

This invention relates to a high speed transportation vehicle and more particularly to a high speed transportation vehicle which is supported from a surface by means of a thin layer of gas.

According to the construction of the present invention there is provided a vehicle having a plurality of gas pressure levitation devices affixed thereto in a position to oppose the surface upon which the vehicle is to be supported, for example, a support member or pair of support members which may conveniently take the form of a rail or a pair of rails. Gas pressure levitation devices are also affixed to the vehicle in opposed relationship to both sides of the single rail if such is employed, or on both sides of one of the rails if a pair of rails is employed. Gas under pressure is supplied to these gas pressure levitation devices so that the vehicle is supported on a thin layer of gas and so that thin layers of gas between the last mentioned levitation devices and the sides of the rail restrict the lateral movement of the vehicle. Under high speed conditions, the vehicle may have a tendency to leave the rails as a result of aerodynamic lift conditions generated thereby. To counteract this condition, levitation devices may be positioned in opposed relationship to the undersurface of the rail heads thereby providing a thin layer of gas between the device and the undersurface of the rail which will resist the upward force generated by the high speed travel.

The vehicle is provided with a suitable means of propulsion which may conveniently take the form of ducted fans or jet engines. It can readily be appreciated that very high speeds may be obtained as the result of these prime movers since the whole vehicle is supported by a thin layer of gas between the vehicle and the surface over which it is to travel.

An object of the present invention is the provision of a high speed transportation vehicle.

A further object of the invention is to provide a high speed transportation vehicle which is supported by means of a thin layer of gas.

Another object of the invention is to provide a high speed transportation vehicle which is supported by a thin layer of gas and whose lateral movement is restricted by a thin film of gas located on either side of one of the support members over which the vehicle is designed to move.

A further object of the invention is the provision of a high speed transportation vehicle in which a thin layer of gas is provided between the vehicle and the undersurface of the support system to resist the tendency of the vehicle to leave said support system due to aerodynamic lift conditions.

Other objects and attendant advantages of the present invention will become more apparent as the specification is considered in connection with the accompanying drawings in which.

Figure 1:
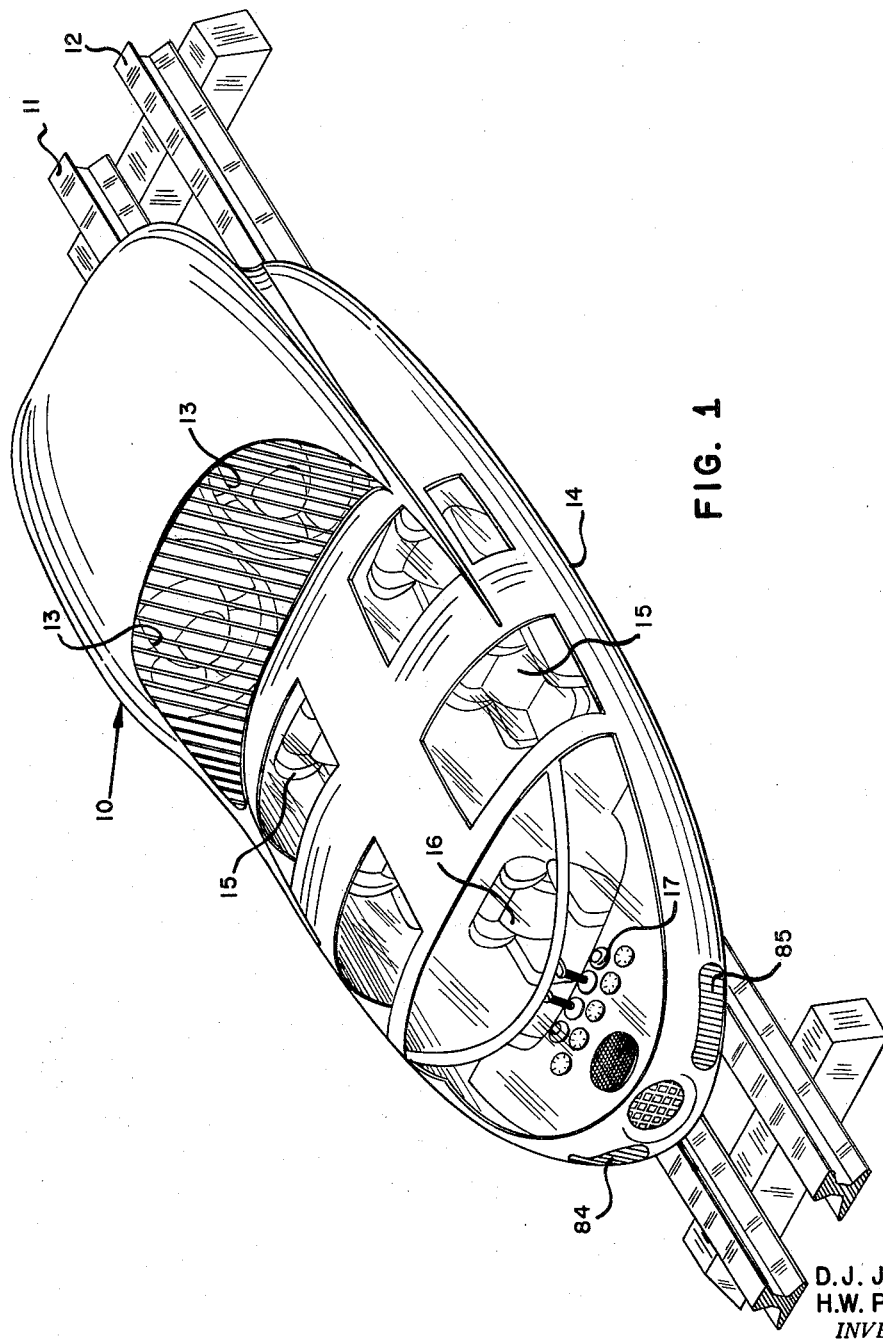
FIGURE 1 is a perspective view of one embodiment of the invention.
Figure 3:
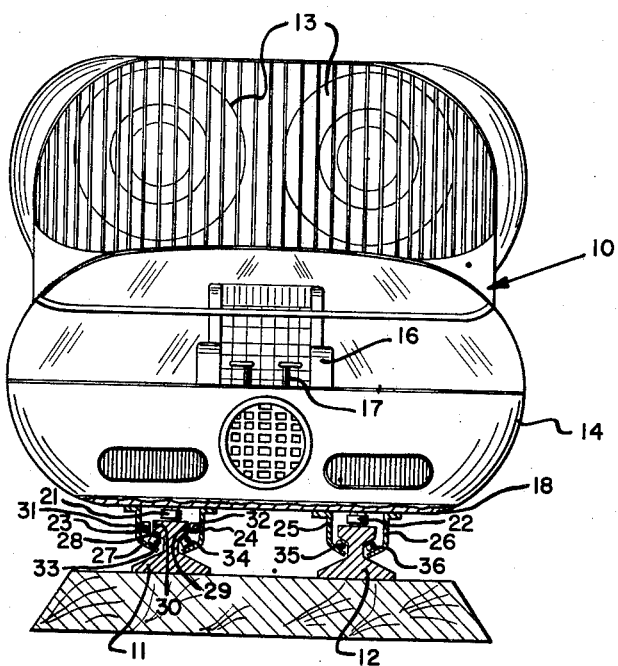
FIGURE 3 is a front elevational view of the embodiment of the invention shown in FIGURE 1; and, FIGURE 4 is a cross sectional view partially in elevation of the air pressure levitation devices employed with the embodiment shown in FIGURE 2 and with one of the rails of the embodiment shown in FIGURES 1 and 3.

Referring now to the drawings in which like reference numerals designate like parts throughout the several views thereof, there is shown in FIGURES 1 and 3, a high speed ground transportation vehicle generally designated by the numeral 10 which is adapted to be propelled over a pair of support members, for example rails 11 and 12, by means of a prime mover capable of supplying thrust, for example a pair of ducted fans 13. The vehicle 10 comprises a vehicle body 14 which is provided with a plurality of seats 15 including a driver's seat 16 which is situated immediately behind a control panel 17.

The vehicle body 14 has a plurality of cross members, one of which is shown at 18, for supporting a pair of gas pressure levitation devices 21 and 22 which are positioned in opposed relationship to the top surfaces of the rails 11 and 12 respectively. The top surfaces of the rails lie in a substantially horizontal plane. Gas under pressure is supplied to these levitation devices for supporting the vehicle on a thin layer of gas under pressure between these devices and the tops of the rails. As can readily be seen by reference to FIGURE 3, the cross member 18 has a plurality of structural members 23, 24, 25, and 26 affixed thereto which are positioned on either side of both of the rails 11 and 12. Each of these structural members has an inwardly extending portion 27 which is positioned adjacent the undersurfaces 28 of each of the rails. The structural members 23 and 24 each carry a gas pressure levitation device designated by the numerals 31 and 32. These devices supply a thin film of gas under pressure between the sides 29 and 30 which lie in the substantially vertical planes at the sides of the rail 11 and the gas pressure levitation devices 31 and 32 thereby providing a means for controlling the lateral movement of the vehicle body.

With the high speeds obtainable by the vehicle body, aerodynamic lift conditions of serious proportions may be generated. To counteract this situation the inwardly extending portion 27 of the structural members affixed to cross member 18 may each be provided with gas pressure levitation devices designated by the numerals 33, 34, 35, and 36. These gas pressure levitation devices provide a thin film of gas under pressure between the devices and the undersurface of the rail which may be in a substantially horizontal plane thereby resisting any aerodynamic lift forces generated by the vehicle body.

Figure 2:
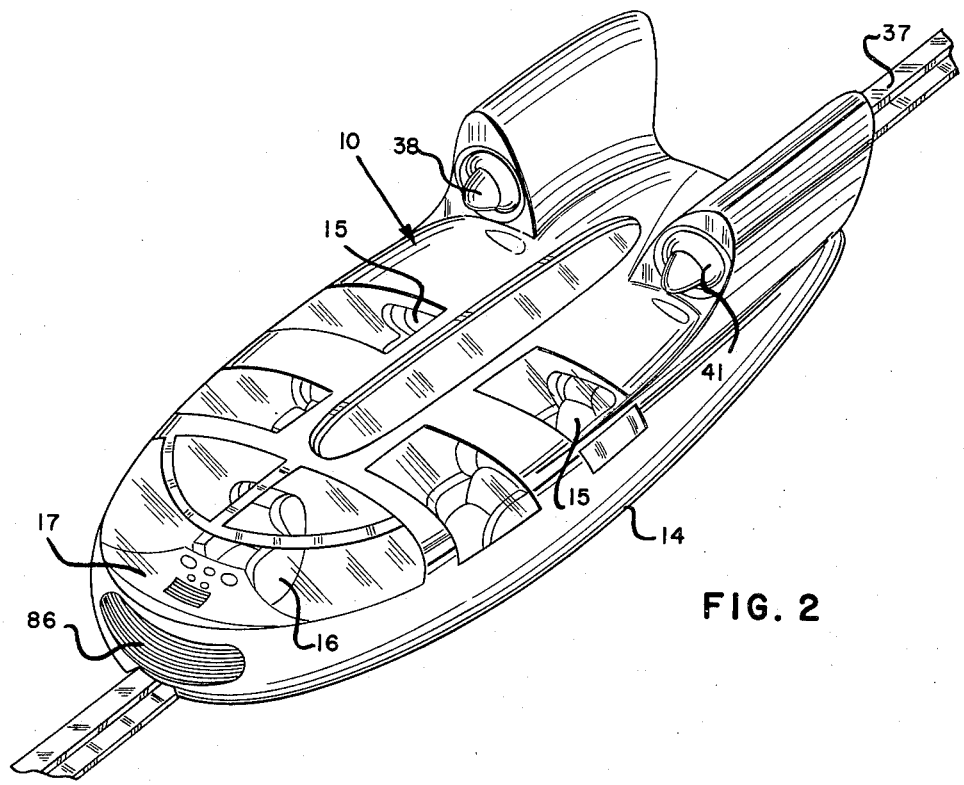
FIGURE 2 is a perspective view of another embodiment of the invention.

Referring now to FIGURE 2 there is shown a high speed ground transportation vehicle which is adapted to be propelled over a single rail 37. The construction of this vehicle is similar to that shown in FIGURES 1 and 3 with the exception of the prime mover which in this case may be a pair of jet engines designated by the numerals 38 and 41. The gas pressure levitation device arrangement for supporting this vehicle is shown in the arrangement surrounding rail 11 in FIGURE 3 and in FIGURE 4.

Figure 4:
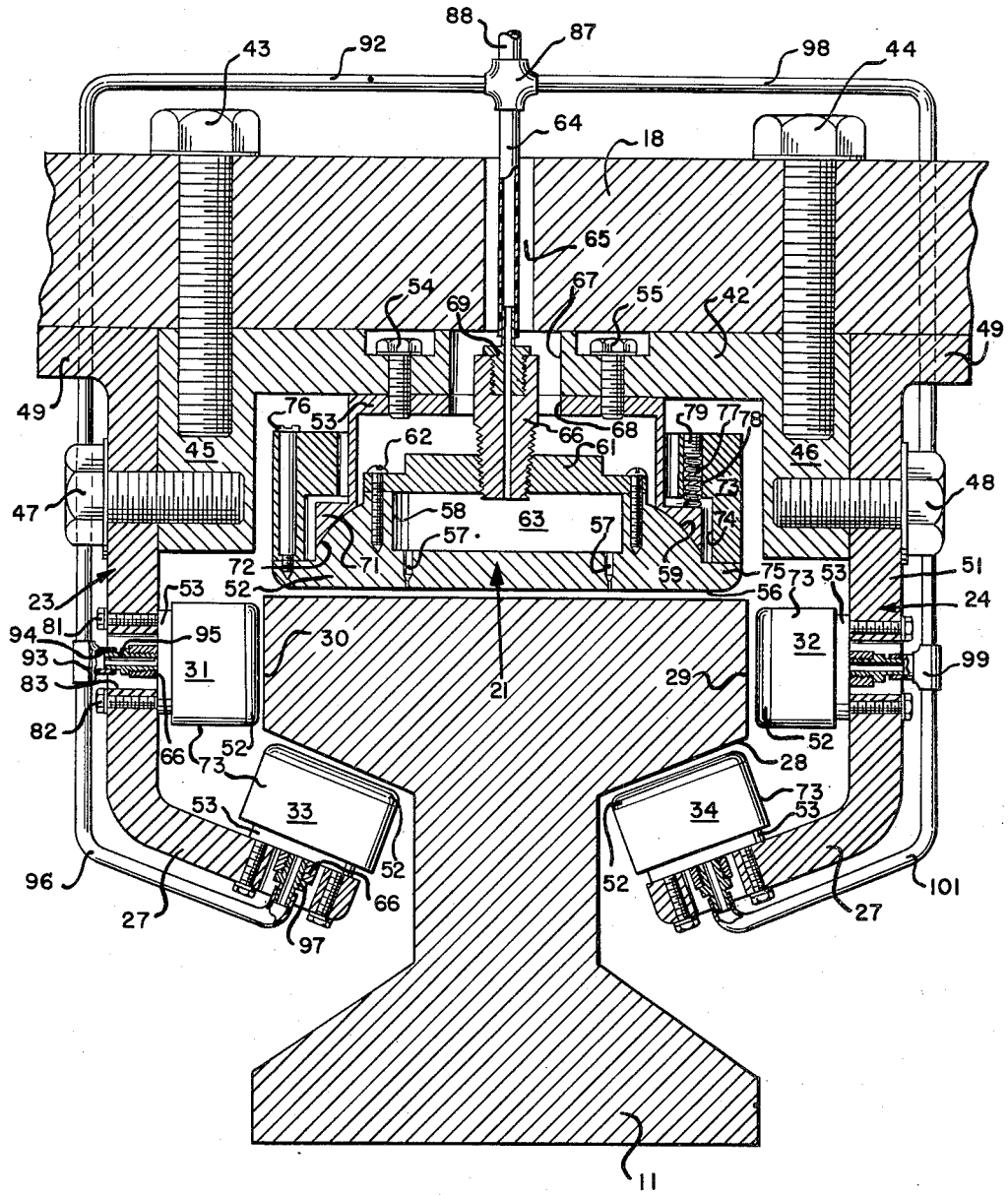

Referring now to FIGURE 4 which shows the gas pressure levitation device arrangement for the vehicle of FIGURE 2 and for the left hand rail 11 of FIGURE 3, there is shown the cross member 18 which is affixed to the vehicle body 14. This cross member 18 has a channel member 42 affixed thereto by means of bolts 43 and 44. Structural members 23 and 24 are affixed to the depending legs 45 and 46 of the channel member by bolts 47 and 48. Each of the structural members has an outwardly extending leg 49 which abuts the cross member 18, a vertically depending portion 51 which has affixed thereto the gas pressure levitation devices 31 and 32 and in addition has an agularly inwardly extending portion 27 which has affixed thereto the gas pressure levitation devices 33 and 34. The main body portion of the channel member 42 has affixed thereto a gas pressure levitation device 21 which is shown in cross section. This gas pressure levitation device is fully explained and described in our copending application Serial No. 744,416, entitled "Support System," and filed June 25, 1958, but for the sake of clarity it will be fully described below.

The gas pressure levitation device 21 comprises a first main member 52 and a second main member 53. The second main member 53 is affixed to the main portion of the channel member 42 by means of bolts 54 and 55. The first main member has a substantially flat bearing surface 56 which is positioned in opposed relationship to the top of the rail 11 and a curved bearing surface 59, preferably of spherical configuration. This member has a plurality of nozzles 57 positioned therein which terminate at the substantially flat surface 56. Suitable means are provided for supplying compressed gas to each of the nozzles 57 which preferably comprises a recess 58 formed in the member 52 with the cover plate 61 covering the top thereof and being affixed to the member by any suitable means; for example, screws 62, to form a manifold 63. The manifold 63 is supplied from a source of gas (not shown) by means of a conduit 64 which extends through a large bore 65 in the cross member 18 and a fitting 66 which extends through a suitably large bore 67 in channel member 42 and a bore 68 in the member 53, and a fitting 69 which connects the fitting 66 with the conduit 64.

The second main member 53 is provided with an enlarged flanged portion 71 at one end thereof which has a curved bearing surface 72, preferably spherical in configuration, and complementary to the bearing surface 59 of the first main member 52. The bore 67 in the member 42 is of sufficient diameter to permit the two main members 52 and 53 to move relative to each other on their bearing surfaces 59 and 72 without interference.

A collar 73 having an undercut portion 74 to receive the bearing surfaces 59 and 72 of the two members 52 and 53 respectively, is positioned in spaced relationship around the second member 53 and is affixed to a flange 75 of the main member 52 through any suitable means, for example, screws 76. This member is dimensioned so that unrestricted movement of the member 52 with respect to the member 53 may take place about the bearing surfaces 59 and 72. Suitable means may be employed for urging the two bearing surfaces 59 and 72 together and preferably takes the form of a plurality of springs 77 positioned in bores 78 of the collar 73. The tension on the springs may be adjusted to a desired value by adjustment of screws 79 which are threadingly received in the bores 78.

Although only one of the gas pressure levitation devices 21 is shown in cross section, it is to be understood that all of the gas pressure levitation devices 22, 31, 32, 33, 34, 35, and 36 are of substantially the same construction but of varying size. The main member 53 of the devices 31 through 36 are fastened to the structural members 23, 24, 25, and 26 by a plurality of through bolts 81 and 82 which extend completely through these structural members. The structural members are also provided with bores 83 which receive the fittings 66 of each of the gas pressure levitation devices.

Gas under pressure is supplied to each of the gas pressure levitation devices for the single rail system used with the vehicle shown in FIGURE 2, and for the left hand rail 11 of the double rail system shown in FIGURES 1 and 3 by the distribution system shown in FIGURE 4. For the right hand rail or rail 12 of the double rail system shown in FIGURE 3 the distribution system is the same except that the gas pressure levitation devices positioned opposite each side of the rail are omitted. Gas under pressure is supplied from a compressor (not shown) which may be located in the vehicle body 14 adjacent air inlets 84 and 85 in FIGURE 1 and air inlet 86 shown in FIGURE 2. These compressors may be run by independent prime mover or by the ducted fans 13 or jet engines 38 and 41 through a suitable gearing and shaft mechanism. The gas is supplied from the compressor to a distribution head 87 through a flexible conduit 88. From this distribution head a portion of the gas is conducted to the gas pressure levitation device 21 by means of conduit 64, fitting 69 and fitting 66. Gas under pressure is supplied to the devices 31 and 33 from distribution head 87 through a flexible conduit 92 which may pass through or behind the cross member 18 and the outwardly extending portion 49 of the support member 23. Opposite the device 31, a distribution T 93 is provided together with a flexible conduit 94 and a fitting 95 to provide compressed gas to the fitting 66 of said device. Another flexible conduit 96 extends from the T 93 to supply compressed gas to the device 33 through a fitting 97 which is connected to the fitting 66 of the device 33. The devices 32 and 34 are similarly supplied by means of flexible conduit 98, T 99, and flexible conduit 101.

It will be understood that the vehicle bodies 14 may be supplied with a plurality of cross members 18, each of which carries an arrangement of gas pressure levitation devices as shown in FIGURE 4 for the single rail system and as shown in FIGURE 3 for the double rail system, thus providing a plurality of these gas pressure device arrangement along the full length of the vehicle.

In the operation of the vehicle, the compressors (not shown) supply gas under pressure to all of the gas pressure levitation devices shown to provide a thin layer of gas, a few thousandths of an inch in thickness between each of the devices and the opposing rail surfaces. As adequately explained in our copending application mentioned above, it is preferred to operate with sufficient gas pressure to create sonic velocities in the immediate area of each of the nozzles 57 of each of the devices. This will assure substantially vibrationless conditions over a wide range of loads.

In regard to the single rail system shown in FIGURES 2 and 4 the gas pressure levitation device 21 supplies a thin layer of gas under pressure to support the weight of the vehicle from the top of the rail 11 while the devices 31 and 32 provide a thin layer of gas under pressure at each side of the rail to prevent lateral movement of the vehicle on the rail so that there will be no metal to metal contact should the vehicle tend to move from side to side. Although in many instances it may not be necessary to provide the additional devices 33 and 34, they provide a thin film of gas under pressure at the undersurface of the rails to prevent the vehicle from leaving the rail due to aerodynamic lift conditions. Thus it can be readily seen that the vehicle is entirely supported on a thin film of gas under pressure and that when the engines 38 through 41 are supplying thrust that the vehicle can easily move down the track at great speeds. It is estimated that these speeds may reach from 200 to 500 m.p.h.

In connection with the double rail system shown in FIGURES 1 and 3, it will be noted that gas pressure levitation devices are provided on the tops of both rails but on the sides of only one of the rails. Thus the only critical dimension in the track system is the width of the rail 11 relative to the spacing of gas pressure levitation devices 31 and 32 rather than the distance between the tracks 11 and 12 as would be the case if gas pressure levitation devices were also supplied on the sides of the rail 12. It will be appreciated that this will result in a substantial reduction in the cost of manufacture and construction of the rail system.

Thus with the vehicle shown in FIGURES 1 and 3, the weight of the vehicle is entirely supported on a thin layer of gas present between the gas pressure levitation devices 21 and 22 and the tops of the rails 11 and 12, while the lateral movement of the vehicle is controlled by the gas pressure levitation devices 31 and 32. As pointed out in connection with the single rail system, the additional gas pressure levitation devices 33, 34, 35, and 36 may be provided if aerodynamic conditions dictate, but the resultant downward force generated thereby is smaller than the upward force created by the devices 21 and 22. It can also be appreciated that a single gas pressure device may be employed with the underside of each rail, provided care is exercised to balance the moments on the vehicle. For example, in the embodiment shown, the devices should be located in the same position on each rail. Thus when ducted fans 13 supply thrust for the vehicle it can be moved over the rails at high speeds as the weight of the vehicle is entirely supported on a thin layer of gas.

Braking of the vehicle may be accomplished by any conventional mechanism such as reversing the thrust of the ducted fans or jet engines, or by water brakes, or by mechanical grippers on the rail.

The high speed ground transportation vehicle of this invention possesses advantages over both conventional aircraft and automotive vehicles. Since the wheel has been eliminated, the vehicle may be operated at speeds far in excess of the conventional automobile. Since the vehicle does not use wings or empennage, the drag of the vehicle is substantially reduced below that of aircraft of comparable capacity. The weight of the vehicle is also lower than that of aircraft of comparable capacity because of the elimination of these parts and because the fuselage or vehicle body can be supported at several points. The vehicle is also much safer than conventional aircraft because it can actually slide to a stop if a power failure occurs.

Thus the present invention provides a high speed transportation vehicle which is both economical and safe.

It will be understood that the invention is not to be limited to the exact construction shown and described, but that various changes and modifications may be made without departing from the spirit and scope of the invention, as defined in the appended claims.

What is claimed is:

1. In a high speed transportation vehicle adapted for movement along a pair of substantially parallel support members, each of said support members having a first surface for supporting the vehicle in a vertical direction, one of said support members having a second and a third surface, said second and third surface of said one support member being the only surfaces for controlling lateral movement of said vehicle, means for supplying a thin layer of gas under pressure between a portion of said vehicle and the first surface only of one of said support members, means for supplying a thin layer of gas under pressure between a portion of the vehicle and the first, second and third surfaces of the other of said support members, and means affixed to said vehicle for propelling said vehicle along said support members.

2. A high speed transportation system comprising a vehicle, a first support member and a second support member, said first and said second support members being positioned in substantially parallel relationship, said vehicle being adapted for movement along said support members, said first support member having a first surface for supporting the vehicle in a vertical direction, said second support member also having a first surface for supporting the vehicle in a vertical direction, said second support member having a second and a third surface, said second and third surfaces of said second support member being the only surfaces for restricting lateral movement of said vehicle, means affixed to said vehicle for supplying a thin layer of gas under pressure between a portion of said vehicle and the first surface of said first support member, means affixed to said vehicle for supplying a thin layer of gas under pressure between a portion of said vehicle and the first surface of said second support member, means affixed to said vehicle for supplying a thin layer of gas under pressure between a portion of the vehicle and the second and third surfaces of the second support member whereby the thin layer of gas under pressure between the second and third surfaces of said second support member and the last mentioned portion of the vehicle restricts the lateral movement of said vehicle.

3. In a high speed transportation vehicle adapted for movement along a first support member and a second support member, said first support member and said second support member being positioned in substantially parallel relationship, said first support member having a first surface for supporting the vehicle in a vertical direction and a second surface for controlling the upward movement of the vehicle, said second support member having a first surface for supporting the vehicle in a vertical direction, a second surface for controlling the upward movement of the vehicle, and a third and fourth surface, said third and fourth surfaces of said second support member being the only surfaces for controlling lateral movement of the vehicle, means affixed to said vehicle for supplying a thin layer of gas under pressure between a portion of said vehicle and the first and second surfaces only of said first support member, means affixed to said vehicle for supplying a thin layer of gas under pressure between the first, second, third and fourth surfaces of said second support member and a portion of the vehicle, and means affixed to said vehicle for propelling said vehicle along said support members.

4. In a high speed transportation vehicle adapted for movement along a first support member and a second support member, said first support member and said second support member being positioned in substantially parallel relationship, each of said support members having a substantially horizontal surface, said second support member having a pair of substantially vertical surfaces, said substantially vertical surfaces of said second support member being the only surfaces for controlling the lateral movement of said vehicle, a first gas pressure levitation device affixed to said vehicle in opposed relationship above the substantially horizontal surface of said first support member, a second gas pressure levitation device affixed to said vehicle in opposed relationship above the substantially horizontal surface of said second support member, a third gas pressure levitation device affixed to said vehicle in opposed relationship to one of said substantially vertical surfaces of said second support member, a fourth gas pressure levitation device affixed to said vehicle in opposed relationship to the other of said substantially vertical surfaces of said second support member, means carried by said vehicle and connected to said gas pressure levitation devices for supplying said gas pressure levitation devices with a gas under pressure, so that said vehicle is supported on a thin layer of gas and so that the lateral movement of said vehicle is restricted by a thin layer of gas, and means affixed to said vehicle for propelling said vehicle along said support members.

5. In a high speed transportation vehicle adapted for movement along a first and a second support member, said first and said second support members being positioned in substantially parallel relationship, each of said support members having a first substantially horizontal surface and a second substantially horizontal surface, said second support member having a pair of substantially vertical surfaces, said substantially vertical surfaces being the only surfaces on said support members for controlling the lateral movement of said vehicle, a first gas pressure levitation device affixed to a portion of said vehicle overlying the first substantially horizontal surface of said first support member and being positioned in opposed relationship thereto, a second gas pressure levitation device affixed to a portion of said vehicle overlying the first substantially horizontal surface of said second support member and being positioned in opposed relationship thereto, a third gas pressure levitation device affixed to said vehicle in opposed relationship to one of said substantially vertical surfaces of said second support member, a fourth gas pressure levitation device affixed to said vehicle in opposed relationship to the other of said substantially vertical surfaces of said second support member, a fifth gas pressure levitation device affixed to a portion of said vehicle underlying the second substantially horizontal surface of said first support member and being positioned in opposed relationship thereto, said first and said fifth gas pressure levitation devices being the only gas pressure levitation devices positioned in opposed relationship to the surfaces of said first support member, a sixth gas pressure levitation device affixed to a portion of said vehicle underlying the second substantially horizontal surface of said second support member and being positioned in opposed relationship thereto, means carried by said vehicle and connected to said gas pressure levitation devices for supplying said gas pressure levitation devices with a gas under pressure so that said vehicle is supported on a thin layer of gas, and so that the lateral movement of said vehicle is restricted only by a thin layer of gas positioned between the third gas pressure levitation device and one of the substantially vertical surfaces of said second support member and by a thin layer of gas positioned between the fourth gas pressure levitation device and the other substantially vertical surface of said second support member, and so that any upward forces on the vehicle are resisted by a thin layer of gas, and means affixed to said vehicle for propelling said vehicle along said support members.

6. A high speed transportation system comprising a vehicle, a first support member, and a second support member, said first and said second support members being positioned in substantially parallel relationship, each of said support members having a substantially horizontal surface, said second support member having a first side and a second side which extend from opposite sides of said horizontal surface in opposed substantially vertical planes, a portion of said vehicle overlying the substantially horizontal surface of each of said support members, means affixed to said portion of said vehicle for supplying a thin layer of gas under pressure between said portion of said vehicle and only the horizontal surface of said first support member, means affixed to said portion of said vehicle for supplying a thin layer of gas under pressure between said portion of said vehicle and the horizontal surface of said second support member, a second portion of said vehicle positioned in opposed relationship to said first side of said second support member, means affixed to said second portion of said vehicle for supplying a thin layer of gas under pressure between said second portion of said vehicle and the first side of said second support member, a third portion of said vehicle positioned in opposed relationship to the second side of said second support member, means affixed to said third portion of said vehicle for supplying a thin layer of gas under pressure between said third portion of said vehicle and the second side of said second support member, and means affixed to said vehicle for propelling said vehicle along said support members.

References Cited in the file of this patent

UNITED STATES PATENTS

| | | |
|---|---|---|
| 1,000,009 | Jenison | Aug. 8, 1911 |
| 1,152,451 | Theryc | Sept. 7, 1915 |
| 1,411,597 | Trask | Apr. 4, 1922 |
| 1,415,400 | Roughmanns | May 9, 1922 |
| 1,603,393 | Malcolm | Oct. 19, 1926 |
| 1,629,767 | Valdes | May 24, 1927 |
| 1,685,035 | Robertson | Sept. 18, 1928 |
| 1,698,482 | Nicin | Jan. 8, 1929 |
| 2,511,979 | Goddard | June 20, 1950 |
| 2,724,966 | Northrup et al. | Nov. 29, 1955 |
| 2,788,749 | Hinsken et al. | Apr. 10, 1957 |
| 2,864,318 | Toulmin | Dec. 16, 1958 |
| 2,909,129 | Nichols et al. | Oct. 20, 1959 |

FOREIGN PATENTS

| | | |
|---|---|---|
| 26,976 | France | Nov. 9, 1860 |

OTHER REFERENCES

Publication (A): Product Engineering, page 23, Apr. 21, 1958.

Publication (B): Washington Star, Apr. 6, 1958, in the comics section feature "Closer Than We Think," disclosing the "Flying Carpet Car."

Publication (C): Popular Mechanics, pages 74–82, July 1957.

Publication (D): The Iron Age, pages 68 and 71, Apr. 3, 1958.